Dec. 13, 1966  T. L. FAWICK  3,291,272
DRIVE CUP IN MAGNETIC CLUTCH OR BRAKE
Filed Sept. 2, 1964

INVENTOR.
THOMAS L. FAWICK
BY
Ely, Golrick and Flynn
ATTORNEYS

United States Patent Office 3,291,272
Patented Dec. 13, 1966

3,291,272
DRIVE CUP IN MAGNETIC CLUTCH OR BRAKE
Thomas L. Fawick, Shaker Heights, Ohio, assignor to Fawick Corporation, a corporation of Michigan
Filed Sept. 2, 1964, Ser. No. 393,858
6 Claims. (Cl. 192—84)

This invention relates to a drive cup in a multiple-disc clutch or brake.

Various clutches or brakes of the multiple-disc or plate type, particularly magnetic clutches or brakes, include a drive cup composed of an end wall extending across one end of the clutch or brake and a plurality of circumferentially spaced drive fingers formed integral with the end wall and extending from the end wall longitudinally, or axially, of the clutch or brake into driving engagement with the friction discs or plates of one set. The common practice, prior to the present invention, has been to machine this drive cup from a relatively massive one-piece forging having a longitudinal, or axial, dimension at its outer periphery sufficient to provide the required length of the drive fingers. Such forgings had to be individually turned and then longitudinal slots had to be milled to form the several circumferentially spaced drive fingers on each drive cup. Also, the forging for the drive cup had to be of relatively high carbon steel, so as to enable subsequent hardening of the drive fingers by suitable heat treatment. The manufacture of such drive cups for multiple-disc clutches or brakes was excessively costly due to these and other factors.

The present invention is directed to a novel and improved construction of the drive cup in a multiple-disc clutch or brake which enables it to be manufactured in a much simplified manner at substantially lower cost.

Accordingly, it is a principal object of this invention to provide a novel and improved drive cup in a multiple-disc clutch or brake.

Another object of this invention is to provide such a drive cup which may be manufactured in a simplified manner and at substantially lower cost than was possible heretofore.

Further objects and advantages of this invention will be apparent from the following detailed description of a presently preferred embodiment, referring to the accompanying drawing.

Figure 1:
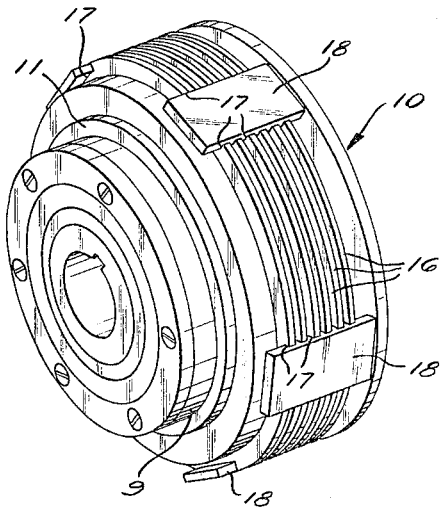
FIGURE 1 is a perspective view showing a multiple-disc magnetic clutch embodying the drive cup of the present invention.
Figure 2:
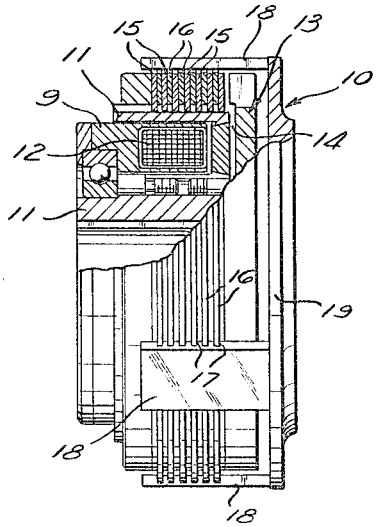
FIGURE 2 is a view, partly in side elevation and partly in axial section, of the clutch shown in FIG. 1.

Referring first to FIGS. 1 and 2, the drive cup of the present invention is shown embodied in a multiple-disc magnetic clutch or brake of otherwise conventional construction. In this device, the drive cup 10 is part of one relatively rotatable assembly and a housing 11 is part of a second relatively rotatable assembly, the two assemblies being mounted for rotation of one with respect to the other.

As shown in FIG. 2, the housing 11 is closely mounted rotatably on a stationary annular body 9 which carries an annular coil 12. The coil is connected to be energized selectively. When energized, this coil induces magnetic flux to flow through a path through certain portions of the housing 11. This flux path is completed through magnetic portions of an armature 13 in a known manner. Normally, when coil 12 is de-energized, the armature is spaced axially from the adjacent pole faces of housing 11 by an air gap 14, as shown in FIG. 2. However, when the coil is energized the armature is attracted magnetically to the left in FIG. 2 to close the air gap. The armature 13 is suitably coupled to the housing 11 so that they are rotatable in unison, while he armature is movable axially (or longitudinally) with respect to the housing 11 upon energization or de-energization of the coil 12.

The housing 11 carries a first set of axially spaced friction discs or plates 15, which are shown as annular members splined to the outside of the housing so that they are rotatable in unison with the housing and are slidable longitudinally of the housing.

A second set of axially spaced friction discs or plates 16 are interleaved with the discs 15 of the first set in confronting relationship to one another. The friction discs 16 of the second set are formed with circumferentially spaced slots 17 at their outer edges which snugly receive the respective longitudinally extending drive fingers 18 on the present drive cup 10.

In the operation of the clutch or brake, when the coil 12 is de-energized, the respective friction plates 15 and 16 are out of torque-sustaining frictional engagement with each other, and therefore the housing 11 and the drive cup 10 are rotatable relative to one another. However, when the coil 12 is energized the armature 13 is magnetically attracted to the left in FIG. 2 and it forces the respective friction plates or discs 15 and 16 into torque-sustaining frictional engagement with each other, thereby frictionally coupling the housing 11 and the drive cup 10 to one another for rotation in unison.

The clutch or brake described thus far is of known construction and mode of operation, and it is to be understood that it is merely illustrative of the general type of clutch or brake in which the drive cup of the present invention may be embodied.

In accordance with the present invention, the drive cup in the multiple-disc clutch or brake is composed of an end plate 19, which for reasons of cost preferably is of cold-rolled, low carbon steel, such as 1020 (0.20% carbon) steel, and separately formed, longitudinal drive fingers 18 which are fused to the end plate, such as by brazing or welding. These drive fingers are of high carbon, tempered, spring steel, such as 1060 (0.60% carbon) steel.

Figure 3:
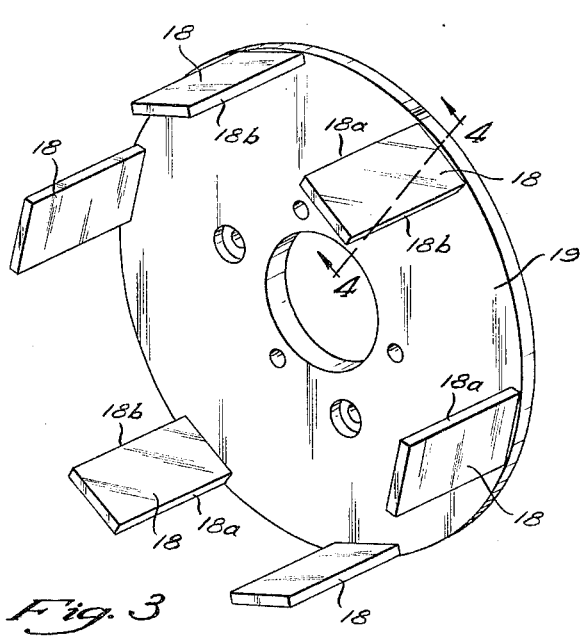
FIGURE 3 is a perspective view on a larger scale showing the drive cup of the present invention.
Figure 4:
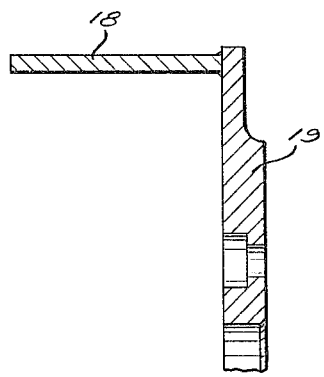
FIGURE 4 is an enlarged fragmentary section taken along the line 4—4 in FIG. 3 and showing the fused attachment of one o fthe longitudinal drive fingers to the end plate in the present drive cup.

The drive fingers shown are flat rectangular segments cut from steel spring stock, which is readily available at comparatively low cost. Each drive finger 18 has its opposite major faces disposed perpendicular to a radius from the center of the end plate 19 passing through the drive finger midway between the latter's opposite longitudinal edges 18a and 18b (FIG. 3). Since they are of tempered spring steel, they are hard enough to hold up under the stresses imposed upon them due to their driving engagement with the friction plates 16 of the second set when carrying the load. After they have been fused to the end plate 19 no subsequent heat treatment is required in order to impart the required hardness to them. That is, the spring steel stock from which they are cut has the required hardness and other characteristics necessary for the successful functioning of these drive fingers 18 in the clutch or brake. This is in contrast to the prior practice with respect to one-piece forged drive cups, where the drive fingers had to be hardened by suitable heat treatment after the drive cup had been machined.

Preferably, the several drive fingers 18 are spaced apart at equal intervals circumferentially on the end plate 19, as shown in FIG. 3, so that the load is symmetrically distributed among them.

Where the fusion of the drive fingers 18 to the end plate 19 is by brazing, the brazing material preferably is only of the order of .002 to .003 inch thick, so as not to impair excessively the shear strength of the finished drive cup.

By virtue of the novel construction of the present drive cup, its cost and manufacturing complexity are greatly reduced. The end plate 19 may be made from a stamping of relatively low cost, low carbon steel. The several drive fingers 18 are initially formed separately from the end plate, and they may be precisely positioned with respect to each other by a suitable fixture which holds them in place while they are being brazed or welded to the end plate. The drive fingers are of tempered spring steel, which is ideally suited for this purpose and does not require subsequent hardening treatment, thereby contributing to the greatly reduced cost of the present drive cup. Various machining operations which were necessary heretofore in the manufacture of such drive cups are eliminated or greatly simplified by the present novel construction of the cup, and the material costs are also reduced.

While a presently-preferred embodiment of this invention has been described in detail herein and illustrated in the accompanying drawings, it is to be understood that the invention is susceptible of other embodiments and that various modifications, omissions and refinements which depart from the disclosed embodiment may be adopted without departing from the spirit and scope of this invention.

I claim:

1. A drive cup for use in a multiple-disc clutch or brake having interleaved first and second sets of friction discs and means for bringing the discs of said first and second sets into torque-sustaining frictional engagement with each other, said drive cup comprising an end plate and a plurality of separately formed tempered spring steel fingers, and means securing said separately formed tempered spring steel fingers individually to said end plate at circumferentially spaced locations thereon and projecting from said end plate longitudinally for driving engagement with the friction discs of the second set.

2. The drive cup of claim 1, wherein said fingers are brazed to said end plate.

3. The drive cup of claim 1, wherein said fingers are welded to said end plate.

4. A drive cup for use in a magnetic clutch or brake having a housing, coil means in flux-inducing relationship to said housing, a first set of friction discs coupled to said housing for rotation therewith and shiftable longitudinally of said housing, a second set of friction discs interleaved with the discs of said first set and mounted for relative rotation with respect thereto and for movement longitudinally of said housing, and a magnetically attractable armature in proximity to said housing to be attracted toward said housing when said coil means is energized, said armature in one position thereof maintaining the friction discs of said first and second sets in torque-sustaining frictional engagement with each other, said drive cup being composed of an end plate and a plurality of separately formed tempered spring steel fingers, and means securing said separately formed tempered spring steel fingers individually to said end plate at circumferentially spaced locations thereon and extending from said end plate longitudinally for driving engagement with the friction discs of the second set.

5. In a magnetic clutch or brake having a housing, coil means in flux-inducing relationship to said housing, a first set of friction discs coupled to said housing for rotation therewith and shiftable longitudinally of said housing, a second set of friction discs interleaved with the discs of said first set and mounted for relative rotation with respect thereto and for movement longitudinally of said housing, and a magnetically attractable armature in proximity to said housing to be attracted toward the latter when said coil means is energized, said armature in one position thereof maintaining the friction discs of said first and second sets in torque-sustaining frictional engagement with each other, the improvement which comprises: a drive cup composed of a low carbon steel end plate and a plurality of separately formed tempered spring steel fingers, and means fusing said separately formed tempered spring steel fingers individually to said end plate at circumferentially spaced locations thereon and extending from said end plate longitudinally into driving engagement with the friction discs of said second set.

6. A drive cup for use in a multiple-disc clutch or brake having interleaved first and second sets of friction discs and means for bringing the discs of said first and second sets into torque-sustaining frictional engagement with each other, said drive cup comprising an end plate of cold-rolled low carbon steel and a plurality of tempered high carbon spring steel fingers fused to said end plate at circumferentially spaced locations thereon and projecting from said end plate longitudinally for driving engagement with the friction discs of the second set.

References Cited by the Examiner
UNITED STATES PATENTS

| | | | |
|---|---|---|---|
| 2,632,543 | 3/1953 | Wilson | 192—69 |
| 2,760,615 | 8/1956 | Kershner | 192—112 X |
| 2,912,088 | 11/1959 | Breyer | 192—84 X |
| 2,933,171 | 4/1960 | Kraeplin | 192—69 X |
| 3,233,477 | 2/1966 | O'Brien | 192—69 X |

DAVID J. WILLIAMOWSKY, *Primary Examiner.*

A. T. McKEON, *Assistant Examiner.*